United States Patent [19]

Faraci et al.

[11] Patent Number: 5,896,461
[45] Date of Patent: Apr. 20, 1999

[54] COMPACT SPEAKERPHONE APPARATUS

[75] Inventors: Philip Faraci, Leesburg; Jeremy F. Skene, Herndon, both of Va.

[73] Assignee: Coherent Communications Systems Corp., Ashburn, Va.

[21] Appl. No.: 08/419,642

[22] Filed: Apr. 6, 1995

[51] Int. Cl.⁶ .............. H04R 9/08; H04R 11/04; H04R 1/02; H04M 1/00
[52] U.S. Cl. .............. 381/386; 381/361; 379/420; 379/432; 379/435; 379/440
[58] Field of Search .......................... 381/188, 205, 381/90, 88, 89, 155, 168, 169, 355, 356, 361, 386, 387, 389, 390; 379/61, 388, 420, 424, 428, 432, 435, 454, 440, 434

[56] References Cited

U.S. PATENT DOCUMENTS

| | | |
|---|---|---|
| 4,237,339 | 12/1980 | Bunting et al. . |
| 4,694,499 | 9/1987 | Bartlett ............................ 381/155 |
| 4,836,326 | 6/1989 | Wehner ............................ 381/386 |
| 5,121,426 | 6/1992 | Baumhauer, Jr. et al. ......... 379/420 |
| 5,138,651 | 8/1992 | Sudo . |
| 5,185,791 | 2/1993 | Itoyama et al. .................. 379/435 |
| 5,224,151 | 6/1993 | Bowen et al. .................... 379/420 |
| 5,369,701 | 11/1994 | McAteer et al. . |
| 5,490,213 | 2/1996 | Huang .............................. 379/420 |
| 5,790,679 | 8/1998 | Hawker et al. .................. 379/420 |

*Primary Examiner*—Curtis A. Kuntz
*Assistant Examiner*—Rexford N. Barnie
*Attorney, Agent, or Firm*—Dann, Dorfman, Herrell & Skillman, P.C.

[57] ABSTRACT

A compact speakerphone apparatus is provided with an angled housing for a speaker and a directional microphone. The speaker and microphone are mounted in the housing such that the directional characteristics of the microphone minimizes feedback from the speaker. Additionally, the speaker is mounted to direct sounds away from a horizontal surface upon which the speakerphone may be placed in a just configuration. In a second configuration, the speaker may be mounted upon an elevating bracket for suspending the speaker at a rotated position whereby the directional microphone remains oriented toward a user's mouth.

26 Claims, 7 Drawing Sheets

COMPACT SPEAKERPHONE APPARATUS

FIELD OF THE INVENTION

The present invention relates to telephones. More particularly, the present invention relates to a compact speakerphone apparatus with reduced acoustic coupling between the speaker and the microphone thereof.

BACKGROUND OF THE INVENTION

Desktop telecommunication systems are known wherein a computer workstation is provided with a communication interface for connecting with a telephone line so that a local user can converse and/or exchange data with a remote user at a similarly-equipped computer workstation. Typically, the communication interface includes a pair of jacks for connecting the speaker and the microphone of a telephone handset with a personal computer to allow "hands-free" voice communication. Additionally, such communication interfaces allow interactive voice control of the computer workstation, a remote computer or other voice-response systems; desktop video conferencing; screen sharing; audio graphics; and computer-controlled telephony. Examples of such communication interfaces include the PROSHARE audio card, manufactured by the Intel Corporation of Chandler, Ariz., and the VC8000 audio adapter manufactured by British Telecom.

Telephone headsets are preferable over handsets in desktop telecommunication systems because the users of such systems may be required to operate a keyboard or a mouse during a telephone discussion. Such headsets are disliked by many users for a number of reasons. In video conferencing systems, for example, some users are not pleased with their appearance when wearing a headset. Telephone headsets can be uncomfortable, particularly for extended periods of time. Telephone headsets also prevent multiple users at a single site from participating in a conversation, and the headset user is effectively tethered to the workstation. Additionally, the sequential use of a single headset by several users is unhygienic.

Accordingly, it is desirable to provide a speakerphone device adapted for connection with a desktop telecommunication system. The particular demands of desktop telecommunication systems have, heretofore, militated against the use of speakerphone devices. For example, it is important for such a device to be of a more compact size than a traditional speakerphone, so that the device does not significantly contribute to the clutter of various computer workstation equipment, such as a computer, keyboard, mouse, video camera, and the like. However, as the size of a speakerphone is reduced, various problems in speakerphone operation have been encountered. For example, there is the tendency toward acoustic coupling, or feedback, between the microphone and the speaker as they are moved closer together. Such acoustic coupling can result from airborne audio paths between the speaker and the microphone. Such airborne paths include acoustic paths that can be internal and external to the speakerphone.

Additional acoustic coupling problems can result from audio vibrations propagated within the structural components of the speakerphone from the speaker to the microphone. The effects of such coupling can be perceived by the user as howling, squealing, or echo, all of which can adversely affect the speakerphone in providing intelligible conversation. The degree of acoustic coupling within a speakerphone serves as a practical limit of the amount of gain, and hence the volume, that can be provided to the speaker.

One way to attempt to eliminate acoustic coupling in a speakerphone is to selectively activate the microphone and the speaker, depending upon the relative amplitudes of the locally-generated and remotely-generated audio signals. Voice switching circuits for performing such selective activation have not been entirely satisfactory, because they produce such effects as clipping softly-spoken syllables and have limited the participants to speak in sequences.

In order to provide for full-duplex conversation, high quality speakerphones employ adaptive echo cancellation circuitry which predicts and synthesizes an expected feedback signal, and then subtracts the expected feedback signal from the outbound microphone signal. Although echo cancellation provides significant advantages relative to voice switching, it is not entirely effective to reduce airborne and structural feedback within a speakerphone device of desired compact size for computer workstation-based telecommunications. Therefore, it would be desirable to minimize, via acoustical techniques, the degree of acoustical coupling within a speakerphone device, which facilitates intelligible conversation. It would further be desirable to combine such acoustical coupling reduction with echo cancellation in order to provide a compact speakerphone device. Such a compact speakerphone device would also be desirable for other applications requiring hands-free voice communication, in addition to having particular utility in workstation-based telephony.

SUMMARY OF THE INVENTION

According to one aspect of the present invention, an electronic audio communication apparatus, which is suitable for use as a speakerphone device, is provided with a directional microphone and a speaker. The directional microphone is positioned relative to the speaker in an arrangement to be relatively insensitive to acoustic audio signals from the speaker. The speaker and the microphone are mounted in a housing so as to face the user of the device and have the microphone held at a forward position relative to the front of the speaker.

According to another aspect of the invention, there is provided a speakerphone device in which the speaker and the microphone are mounted within a housing, which has a base for supporting the device upon a horizontal surface. The speaker is mounted in the housing at an angle relative to the base to direct sounds generated by the speaker away from the horizontal surface on which the housing may rest. The microphone is mounted at an angle relative to the base in order to align the microphone substantially toward the mouth of a user who is usually at an elevated position relative to the horizontal surface on which the housing is adapted to rest. The microphone is further positioned in front of the speaker and at an angle thereto such that the microphone is relatively insensitive to sound emanating from the speaker. In order to allow the device to be mounted in an elevated position relative to the horizontal surface of the workstation, such as adjacent to the monitor of a desktop computer, mounting slots are formed within the housing for coupling engagement with a mounting bracket attached to the computer monitor. The mounting bracket is coupled to the mounting slots of the housing in order to position the speakerphone device in a rotated and elevated orientation relative to the usual orientation of the device when it is positioned on the horizontal surface of a desk or table. The relative orientation of the speakerphone device when mounted to the computer is configured to maintain the direction of maximum sensitivity of the microphone in relative alignment with the user's mouth.

According to a further aspect of the invention, a full-duplex speakerphone having echo cancellation circuitry is provided in a compact housing which incorporates structural features for enhancing acoustic isolation of the microphone from the speaker. The structural features for enhancing acoustic isolation include a substantially airtight speaker compartment separated from a microphone compartment by attenuating baffles. The interior of the speaker compartment is contoured to be substantially free of parallel planer surfaces for preventing undesirable acoustic resonance peaks therein. The microphone is positioned at the far side of the microphone compartment from the baffles. Furthermore, the microphone is embedded within a porous foam material which isolates the microphone from structurally-propagated vibrations within the housing while providing a substantially acoustically transparent environment in the vicinity of the microphone. The combined structural and electronic anti-coupling features provide for high quality two-way audio communication in a compact unit.

BRIEF DESCRIPTION OF THE DRAWINGS

The foregoing summary, and the following detailed description, will be best understood when read in conjunction with the attached figures, in which.

DETAILED DESCRIPTION OF THE INVENTION

Microphones can be broadly categorized as omni-directional or directional. Omni-directional microphones are substantially equally sensitive to acoustic audio signals arriving at the microphone from any direction. It is noted that the term "sensitivity" is often defined in the acoustic arts as the inverse proportion of the electrical response produced by a microphone relative to an incident sound pressure level. For clarity of explanation, the term "sensitivity" is used in a more colloquial sense herein to refer to the proportionate electrical response relative to the incident sound pressure level. Hence, as used herein, the term "greater sensitivity" refers to a relatively larger electrical response for a given sound pressure level, relative to a reduced, or lesser, sensitivity.

Directional microphones exhibit a greater sensitivity to sounds arriving from certain directions than to sounds arriving from other directions. Bi-directional microphones, for example, are characterized by two directions of maximum sensitivity, usually separated by 180°. Uni-directional microphones are characterized by a single direction of maximum sensitivity. One type of uni-directional microphone is a cardioid microphone, wherein the sensitivity pattern resembles a cardioid, or "heart-shape", which has at least one direction of minimum sensitivity. The direction of minimum sensitivity of a cardioid microphone is ordinarily at an angle of 180° from the direction of maximum sensitivity.

Cardioid microphones include super-cardioids and hyper-cardioids, which may have two minima separated by angles of ±120° to ±140° from the direction of maximum sensitivity. The actual response pattern that is obtained in a practical setting depends upon the acoustic environment of the microphone. The response pattern of a directional microphone will tend to be distorted by nearby acoustically active surfaces (e.g. reflective or absorptive surfaces) and such occurrence can detract from the desired directional characteristic of the microphone. Hence, in order to maintain the directional characteristic of a directional microphone, it is desirable to provide an acoustic environment in the vicinity of the microphone that is isolated from acoustically active surfaces. Such an environment is said to be "acoustically transparent" in that airborne acoustic signals propagate freely in substantially all directions therein.

In the speakerphone device of the present invention, the non-uniform sensitivity characteristic of a directional microphone is utilized to position the microphone and the speaker relative to one another in such a way that the acoustic audio signals produced by the speaker arrive at the microphone in a direction from which the microphone has reduced sensitivity.

Figure 1:
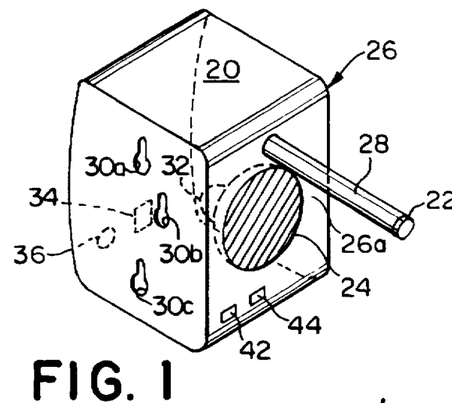
FIG. 1 is a perspective view of a compact speakerphone device according to one embodiment of the invention.

In one embodiment of a speakerphone device 20, as shown in FIG. 1, a directional microphone 22 is positioned in front of, and slightly above, a speaker 24. The speaker 24 is selected to be about 2 inches to 3 inches in diameter, and preferably 2¾ inches in diameter, and is mounted behind the front surface 26a of a housing, generally designated 26. The housing 26 is preferably between about 5 inches and 7 inches in height. The front of the speaker 24 is sealed to the front portion of the housing 26, forming an airtight speaker compartment within the housing 26.

A microphone stalk 28 is mounted to the housing 26 and extends forward from the housing 26 by about 5 to 7 inches, and preferably 6 inches. The microphone 22 is mounted to the end of the stalk 28. Microphone 22 is preferably a uni-directional microphone, such as a cardioid microphone, having minimum sensitivity to signals arriving from behind, such as the signals emanating from speaker 24, during a two-way telephone conversation.

Mounting holes 30a–c are formed in the sides of the housing 26, so that the speakerphone device 20 can be attached to a bracket (not shown), which in turn is attached to a computer monitor (not shown) for suspending the speakerphone device 20 from the side of the computer monitor. Preferably, similar mounting holes are provided on the opposite side of the housing 26 so that the speakerphone device 20 may be suspended from either the left or right side of a computer monitor. The mounting holes 30a–c are partitioned from the interior of the housing 26 so that an airtight chamber is maintained in the interior of the housing. Maintaining such an airtight chamber enhances the directionality of the speaker in order to reduce acoustic coupling.

The speaker 24 and the microphone stalk 28 are adapted to be supported by the housing 26, when coupled to a computer monitor, so that the speaker and the microphone 22 are positioned away from the computer monitor by the same distance, regardless of whether the speakerphone device is suspended from the left or right sides of the computer monitor.

In order to prevent the magnetic field of the speaker 24 from interfering with the operation of the monitor, the rear of the speaker is surrounded by a metal shield 32 (indicated by dotted lines), for example a steel shield, having a high magnetic permeability for confining the magnetic field within the housing 26.

At the rear of the housing 26, there is an RJ45 telephone jack 34 (indicated by dotted lines) for connecting the device with computer communication interface circuitry. Additionally, a DC power jack 36 (also indicated by dotted lines) is provided at the rear of the housing for connecting the internal circuitry of the speakerphone device to a source of electrical power.

Figure 2:
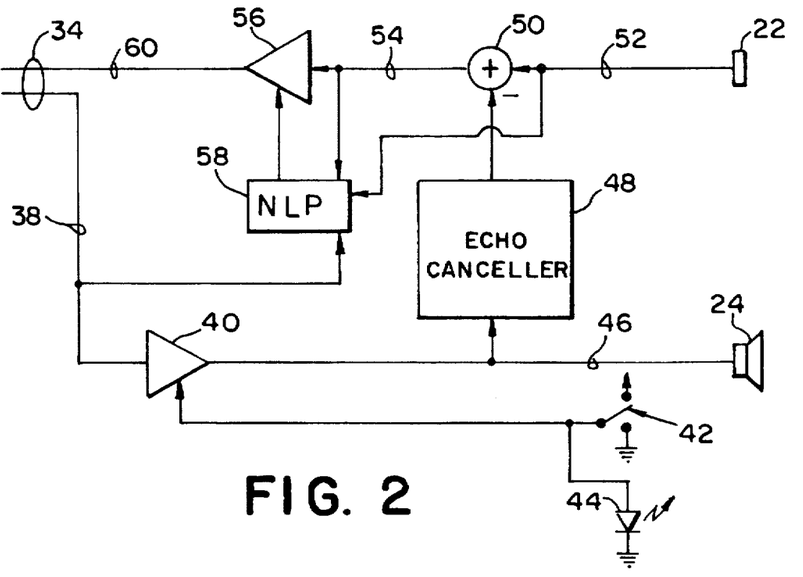
FIG. 2 is a functional block diagram of signal processing circuitry for use in the speakerphone device of the present invention.

A block diagram of the electrical circuit components, which are preferably employed within the speakerphone device 20 is shown in FIG. 2. Speaker signals from a computer communication interface are conducted from jack 34 along line 38 to an audio amplifier 40. The amplifier 40 provides user-selected amplification of the speaker signal. In the embodiment of FIG. 2, a switch 42 is connected with the amplifier 40 for allowing the user to select one of two levels of amplification, as desired. An LED 44 may also be provided to indicate the selected level of amplification to the user. The output of amplifier 40 is connected with the speaker 24 via line 46.

An echo canceler circuit 48 is also connected with line 46 to receive the speaker signal. The echo canceler 48 includes an adaptive finite impulse response filter for convolving the amplifier output signal with an estimated impulse response pertaining to the acoustic signal path between the speaker 24 and the microphone 22. The convolution performed by the echo canceler 48 produces an estimated echo signal at the output thereof. The estimated echo signal from the echo canceler 48 is provided to a summing junction 50 which subtracts the estimated echo signal from the microphone signal. The microphone 22 is connected to the summing junction 50 along line 52. A preamplifier (not shown) may also be connected along line 52 for amplifying the microphone signal to a suitable level for echo removal or to the specified microphone input level for the connection interface.

The output of the summing junction 50 is conducted along line 54 to a variable gain amplifier 56. The gain of the variable gain amplifier 56 is controlled by a non-linear processor 58 connected thereto. The variable gain amplifier 56 attenuates residual echo that may be present along 54 in accordance with a comparison between the speaker signal on line 38 and the difference of the signals on lines 52 and 54. The operation of the echo canceler 48, amplifier 56, and non-linear processor 58 is described in U.S. Pat. No. 5,283,784. The non-linear processor 58 and amplifier 56 may also include noise-injection circuitry for injecting noise into the output signal of amplifier 56 in the manner described in the aforementioned patent. The output of the amplifier 56 is provided along line 60 to the jack 34 for transmission to a microphone input terminal of a communication interface device.

The combined effect of the echo canceling circuitry and the forward positioning of the uni-directional microphone 22 relative to the speaker 24, provides a considerable reduction in overall feedback relative to what would traditionally be expected in a compact speakerphone device. A potential difficulty that may be encountered in the use of the speakerphone device 20, could result from the desire of some users to place the speakerphone device 20 on a table or other horizontal surface, rather than mounting the device 20 in an elevated position on the side of a computer monitor. Placement of the device 20 on a table would introduce an acoustic reflection path from the speaker to the table and then to the microphone, which may undesirably increase the acoustic coupling between the speaker and the microphone, hence limiting the acceptable range of volume. Also, the directional microphone is generally oriented toward the mouth of the user when the speakerphone device is elevated above the surface of a table and mounted on a computer monitor. Placement of the speakerphone device 20 on a table would direct the microphone toward the chest of the user and hence reduce the sensitivity of the microphone to the user's speech, due to the directional sensitivity characteristic of the microphone.

Figure 3A:
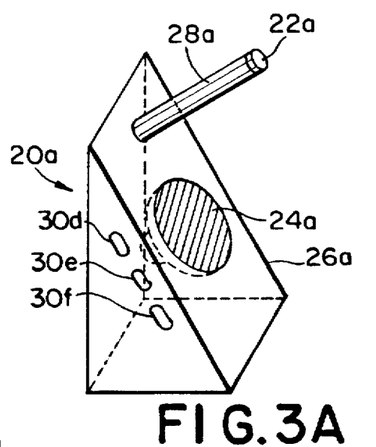
FIG. 3A is a perspective view of a compact speakerphone device according to another embodiment of the invention.

Another approach to providing a compact speakerphone device capable of both desktop and computer-mounted use is illustrated in FIG. 3A. In the speakerphone device 28 of FIG. 3A, the speaker 24a is mounted within the sloping front face of housing 26a so that the speaker is oriented at an angle to the vertical relative to the base of the housing 26a. Thus, when the speakerphone device 28 is placed on a desktop or other horizontal work surface, sound is directed from the speaker 24a at an angle away from the work surface so that reflections from the work surface are minimized. The microphone 22a is mounted on stalk 28a, which extends outwardly from the sloping front surface of the housing 26a in order to position the microphone 22a forward of the speaker 24a, so that the microphone 22a is located along a direction of relatively reduced sensitivity to the speaker 24a.

Figure 3B:
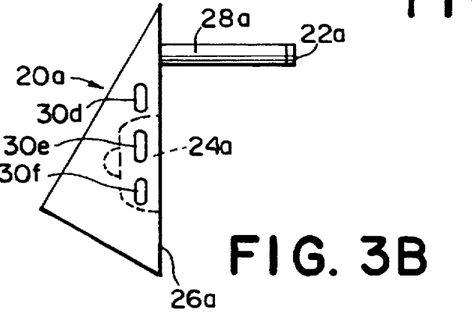
FIG. 3B is a side elevational view of the speakerphone of FIG. 3A, but showing the device in a vertically-mounted orientation as when coupled to a computer monitor (not shown)

Mounting holes 30d–f are provided in the side of the housing 26a, and a suitable bracket (not shown) may be employed for mounting the speakerphone device 28 on the side of a computer monitor, or other equipment that is elevated relative to the work surface. The mounting holes 30d–f and the bracket cooperate to orient the speakerphone device 20a as shown in FIG. 3B when the speakerphone device 20a is mounted on the side of a computer monitor or the like. When the speakerphone device 20a is in the mounted configuration shown in FIG. 3B, the speakerphone device 20a is rotated relative to its orientation—resting of a desktop, as shown in FIG. 3A, in such a way as to compensate for the altered angular position of the user relative to the microphone.

In order to eliminate the possibility of damaging the protruding microphone stalk 28a, it is desirable to reduce the length of, or even eliminate the microphone stalk 28a. In order to maintain the orientation of the microphone so that the direction from the microphone to the speaker coincides with a direction of reduced microphone sensitivity, it should be appreciated that the orientation of the microphone can be adjusted as the length of stalk 28a is reduced. However, as the length of the stalk 28a is reduced, the front surface of the housing 26a increasingly distorts the directional characteristic of the microphone 22a to a point where further reduction of the length of the stalk 28a produces diminishing returns. When dramatically reducing or eliminating the length of the stalk 28a, it should also be appreciated that it is necessary to take additional measures to maintain an acoustically transparent environment in the vicinity of the microphone.

Figure 4:
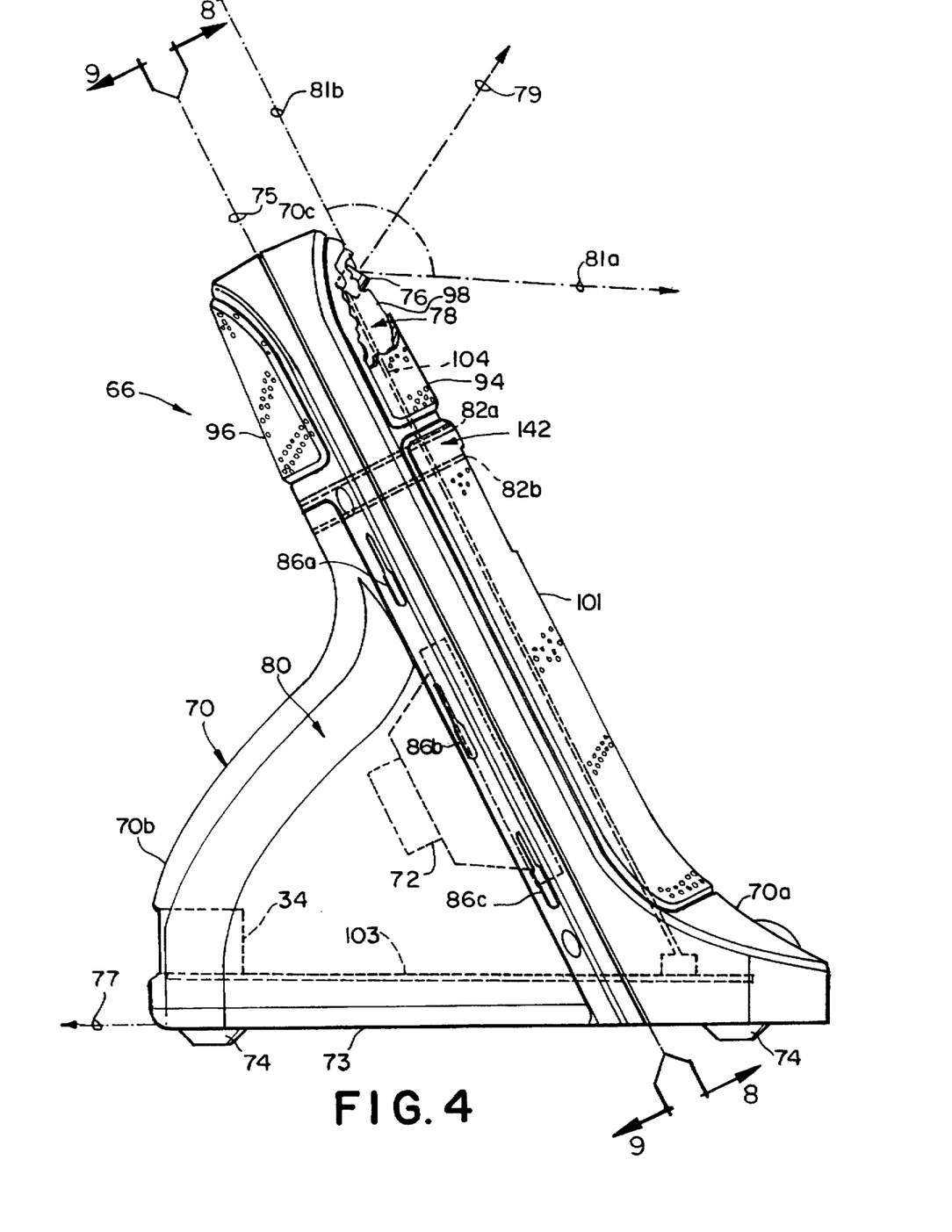
FIG. 4 is a side elevational view of a speakerphone device with parts broken away, according to a further embodiment of the present invention.

A further and preferred embodiment of the invention is shown in FIG. 4. The speakerphone device 66 includes a housing 70, wherein a speaker 72 is mounted at an angle to the vertical relative to the plane of base 73 of the housing. When the base 73 of speakerphone device 66 is rested on a horizontal surface, the main axis of speaker 72 is oriented at an angle of between about 20° and 40° from vertical, and most preferably at about 30°. Hence, the front face of the speaker 72 defines an axis 75 that forms an interior angle of between about 70° and 50°, and most preferably about 60°, with axis 77 aligned with the base 73.

The base of the housing 70 includes elastomeric feet 74 fixed thereto to provide non-skid support for the speakerphone device 66 on the horizontal surface, such as a desktop or a table top. The feet 74 also serve to isolate the housing 70 from vibration of the horizontal surface.

A microphone 76 is positioned within the housing 70 at a distance above the speaker 72, and in the forward direction relative to the axis 75, which lies within a plane defined by the front rim of the speaker 72. An axis 79 normal to the face of microphone 76 is oriented at an angle of between about 20° and 40°, and preferably at about 30°, relative to axis 75. The microphone 76 is a directional microphone, hence the forward and tilted positioning of the microphone 76 serves to substantially align the speaker 72 with a direction of reduced sensitivity of the microphone 76. The sensitivity characteristic of the microphone 76 preferably includes the axis 79 of maximum sensitivity that is oriented substantially normal to the face of the microphone 76. In angular directions other than axis 79, the sensitivity of the microphone 76 is reduced relative to the sensitivity along axis 79. Axes 81a and 81b, which extend outward from the face of the microphone 76, as shown in FIG. 4, define a conical region about the about axis 79, wherein the sensitivity of microphone 76 is at least half (i.e. within 3 dB) of the maximum sensitivity. The interior angle formed between either axis 81a or 81b and the axis 79 is between about 30° to 60° and most preferably about 50°. The sensitivity of the microphone 76 to signals arriving from directions within a region of about ±45° of 180° relative to axis 79, is reduced relative to the maximum sensitivity by at least 6 dB and most preferably by at least about 12 dB. One model of preferred microphone is the EM-121BL electret condenser uni-directional microphone, manufactured by Primo Limited of Japan.

Figure 5:
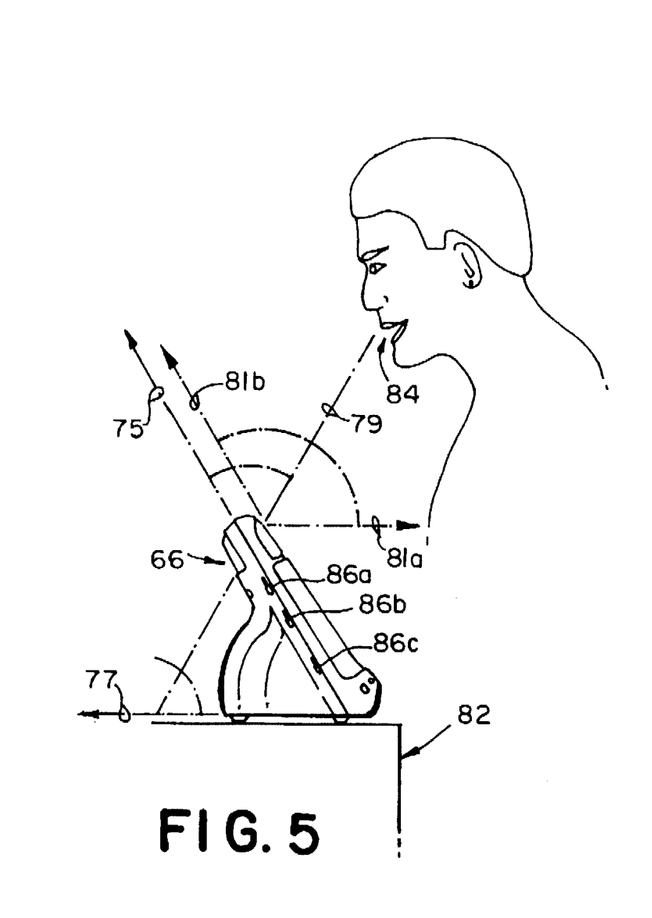
FIG. 5 is a side elevational view of the speakerphone device of FIG. 4 in which the device is supported on the horizontal surface of a workstation.

As can be seen in FIG. 5, the angled positioning of the microphone relative to the base of the housing 70 serves to orient the microphone so that the cone of maximum sensitivity of the microphone is generally oriented toward a user's mouth 84, when the speakerphone device 66 is resting on a desk 82. The user's mouth 84 does not need to be precisely aligned with the axis 79 of maximum sensitivity of the microphone, provided that the half-power points of the microphone sensitivity pattern define a cone that is broad enough to accommodate a suitable variation of alignment with the user's mouth 84.

Mounting slots 86a–c are formed in the side of the housing 70 to allow the speakerphone device 66 to be suspended from a mounting bracket that may be attached to, for example, a computer display device or other equipment having a substantially rectangular housing facing the user. Mounting slots 86a–c are provided on both sides of the housing 70 so that the speakerphone device 66 can be mounted on either side of a computer monitor.

Figure 6:
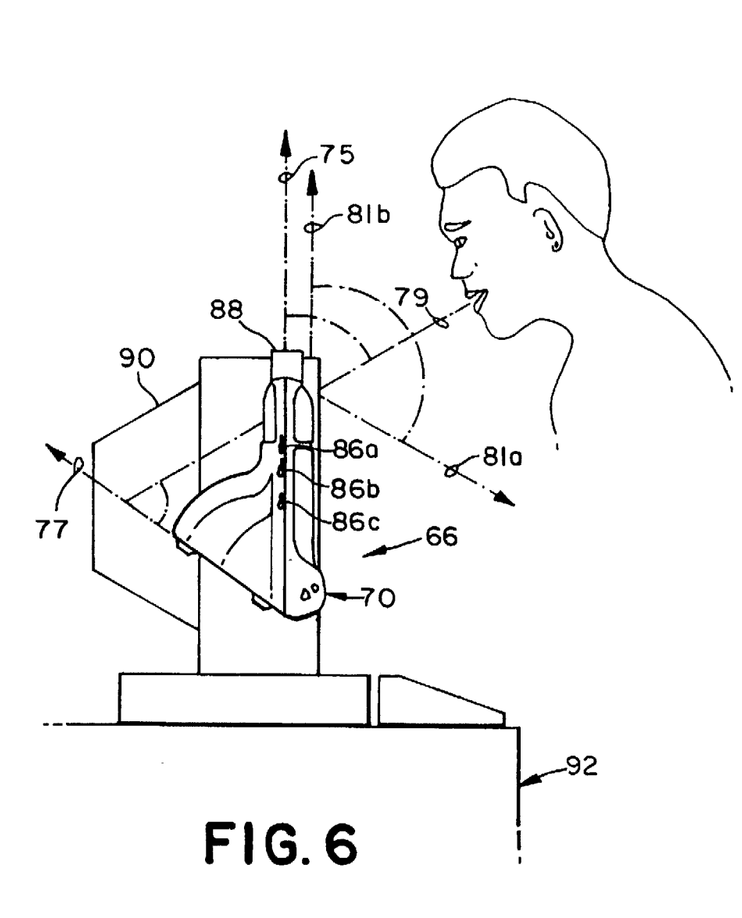
FIG. 6 is a side view of the speakerphone device of FIG. 4 in which the device is coupled to the side of a computer monitor.

Referring now to FIG. 6, the speakerphone device 66 is shown mounted on a computer monitor. When the speakerphone device 66 is mounted to the monitor 90, the mounting bracket 88 and the mounting slots 86a–c cooperate to substantially align the axis 75 of the front of the speaker with the vertical axis normal to the surface of the desk 92. Additionally, the normal axis 79 of the microphone is tilted forward toward the mouth of the user. Thus, the housing 70 is rotated relative to the desktop orientation in such a way as to substantially maintain the cone of maximum sensitivity in general alignment with the user's mouth.

Figures 7A, 7B:
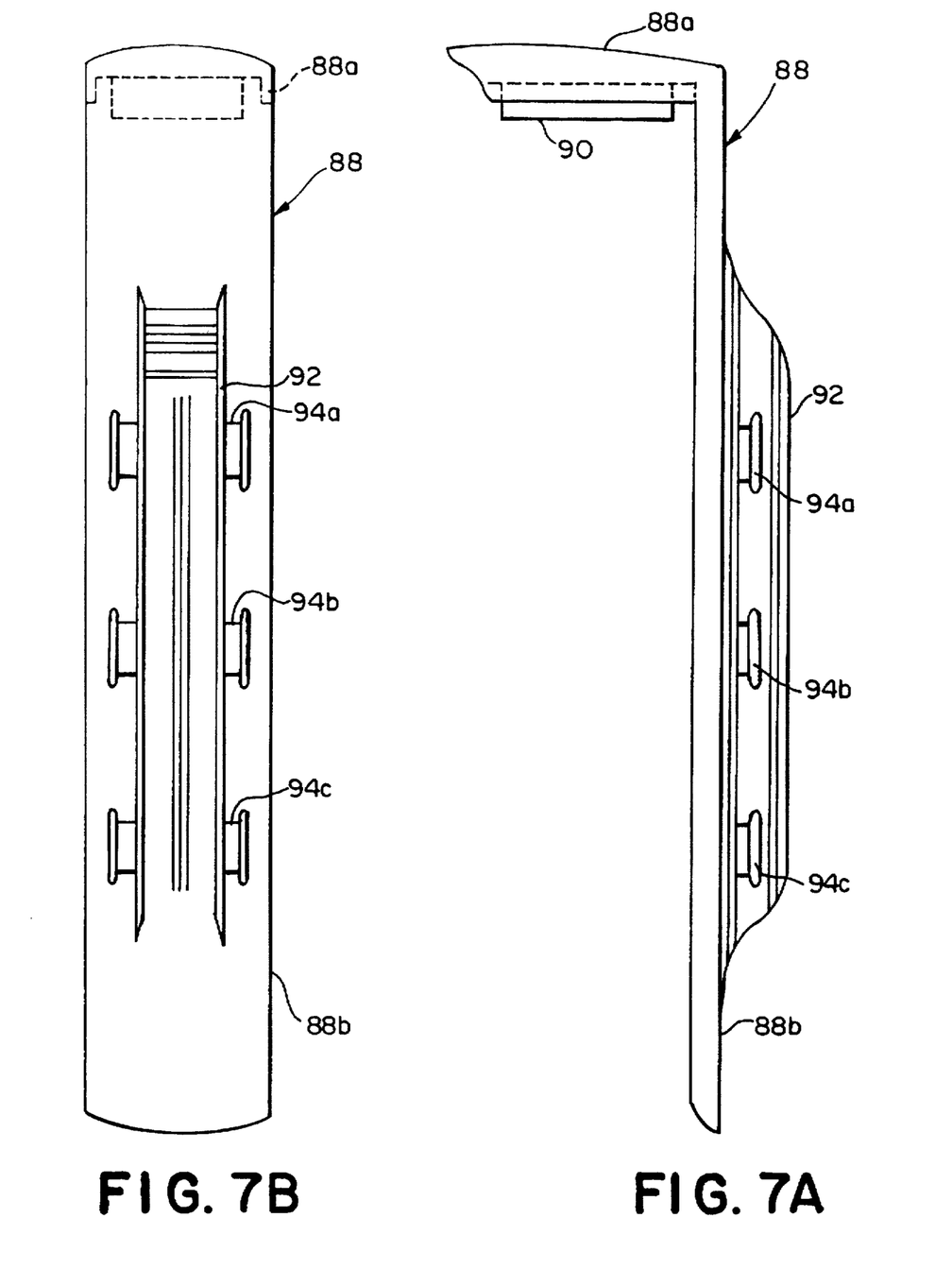
FIG. 7A is a side elevational view of a mounting bracket for vertically mounting the speakerphone device of FIG. 4 on the side of a computer monitor.
FIG. 7B is a front elevational view of the bracket of FIG. 7A.

The mounting bracket 88 is shown in greater detail in FIGS. 7A and 7B. Referring now to FIG. 7A a generally L-shaped bracket 88 includes an upper portion 88a having an engaging surface 90 for engaging the top of a computer monitor. The engaging surface 90 may include a resilient adhesive pad for adhering to the top of the monitor. Other engaging means, such as a hook and loop fastener (e.g. "VELCRO" hook and loop fasteners), may be employed in alternative embodiments.

An elongated lower bracket portion 88b is connected at substantially a right angle to the upper portion 88a for extending downwardly along a side of the computer monitor. The lower portion 88b includes an elongated ridge 92, which protrudes outwardly and extends a substantial distance along the lower portion 88b. As best seen in FIG. 7B, tabs 94a–c are formed along the ridge 92 and project outwardly therefrom in a direction perpendicular to the longitudinal axis of the lower portion 88b of the bracket 88 and parallel to the surface of the bracket 88 contacting the computer monitor. The tabs 94a–c have enlarged heads thereon for insertion into the mounting holes 86a–c of the speakerphone device. The ridge 92 is contoured to mate with the surface of the speakerphone device so that the speakerphone device is maintained sufficiently firmly in position to allow the user to operate the volume controls on the speakerphone device without causing the device to wobble or turn on the bracket 88.

The speakerphone device 66 includes additional structural features to enhance acoustic isolation of the microphone from the speaker. Referring again to FIG. 4, microphone 76 is embedded within an open cell acoustic foam member 98. The open cell foam member 98 mechanically supports the microphone 76 in the preferred orientation and isolates the microphone 76 from structure-propagated acoustic vibrations while providing a substantially transparent acoustic environment in the vicinity of the microphone 76. The open cell foam member 98 has between about 15 pores per inch to about 50 pores per inch, and most preferably about 30 pores per inch. The open cell foam member is preferably formed from a reticulated polyurethane foam, such as "PRO-TECTAIRE" acoustic foam, manufactured by Stephenson & Lawyer of Grand Rapids, Mich. The porosity of the acoustic foam is selected to provide a balance between acoustic transparency and mechanical support for the microphone. Below about 15 pores per inch, the foam does not provide sufficient mechanical support. Above about 50 pores per inch, the foam has decreased transparency and increased transmission of structural vibrations, which can adversely affect desired operation of the microphone.

As shown in FIG. 4, the housing 70 comprises a front housing member 70a and a rear housing member 70b, which are preferably formed of a thermoplastic resin. The front housing member 70a and the rear housing member 70b are adapted to be joined together in mating engagement and to divide the interior of the housing 70 into an upper microphone compartment 78 and a lower speaker compartment 80. A pair of walls or baffles 82a and 82b are formed on the respective housing members between the microphone compartment 78 and the speaker compartment 80 of the assembled housing 70, to enhance the acoustic isolation of the microphone from the speaker, thereby blocking or attenuating internal airborne acoustic signals generated by the speaker from reaching the microphone.

The lateral cross-section of the microphone compartment is in a generally semi-elliptical shape, the flat bottom side being defined by the surface of the baffle 82a and the elliptical arch being defined by the top portion of the housing 70. In order to avoid distortion of the sensitivity pattern of microphone 76, the front and rear surfaces of the microphone compartment 78 are substantially acoustically transparent. The front of the microphone compartment 78 is open with a front grille 94 closing the opening. The rear surface of the microphone compartment 78 is similarly open with a rear grille 96 closing the opening. The grilles 94 and 96 are perforated as described further hereinbelow.

In order to avoid distortion of the microphone sensitivity pattern by the planar surface of baffle 82a, the microphone is positioned on the far side of the microphone compartment 80 from the baffle 82a, such as at a position near the apex of the arch defined by the upper portion of the housing 70. The microphone is further positioned toward the front of compartment 78 but behind the front grille 94. The forward positioning of the microphone 76 within the microphone compartment 78 serves to locate the microphone in front of the axis 75 of the device, and, hence, forward of the front of the speaker. Additionally, the microphone 76 is positioned sufficiently toward the front of the microphone compartment 78 so that the top surface or upper arch 70c of housing 70 is outside of the cone of maximum sensitivity, as indicated in FIG. 4.

Within the speaker compartment 80, speaker 72 is mounted at the preferred angle behind speaker grille 101. Circuit board 103, which carries the electrical circuitry of the speakerphone device 66 is also housed within the speaker compartment 80.

Figure 8:
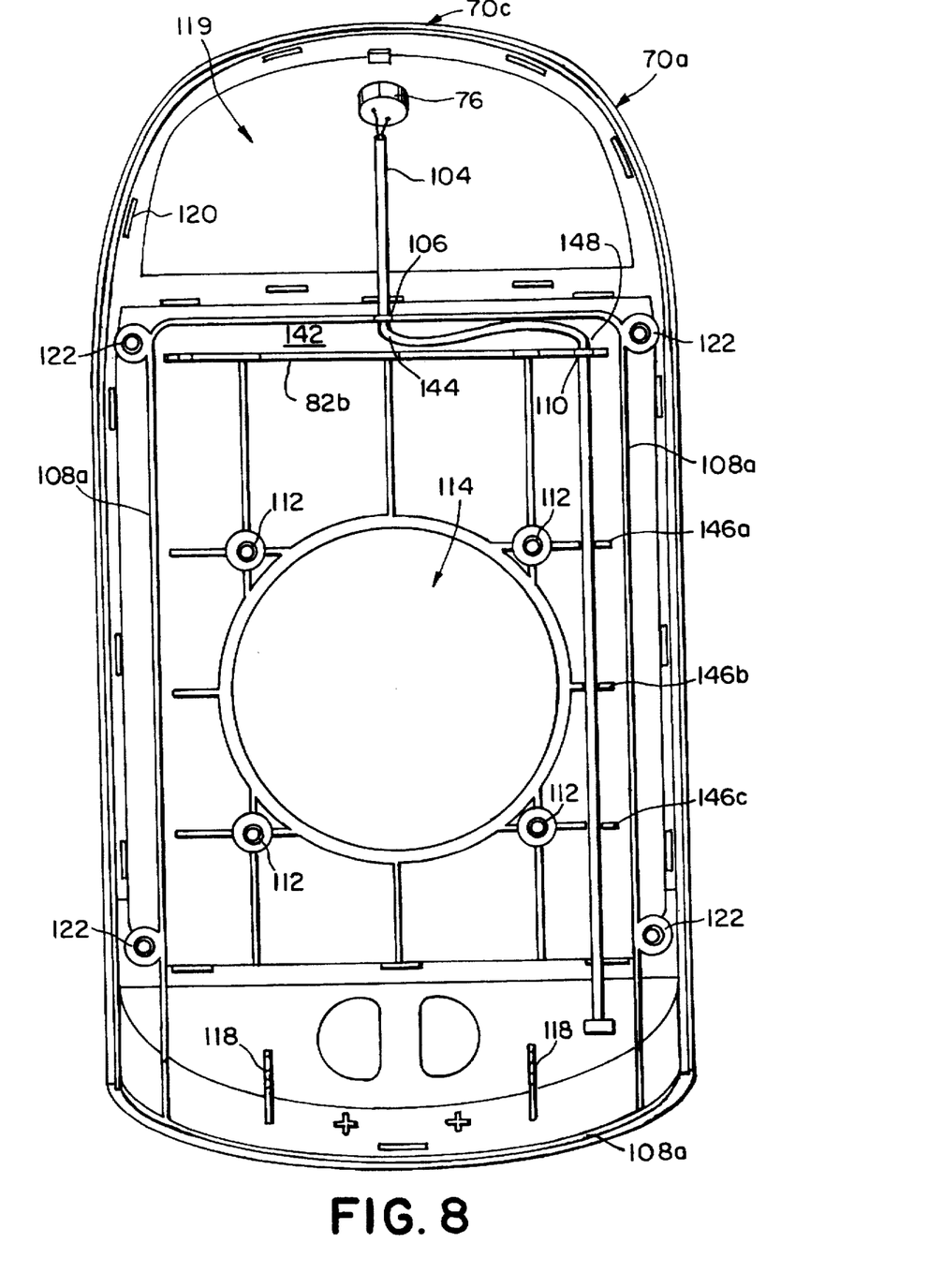
FIG. 8 is a rear view of the interior of the front portion of the housing member taken along line 8—8 of FIG. 4 with the porous member for supporting the microphone, the grille and the circuit board removed.

Referring now to FIG. 8, sealing surfaces 108a are formed within the front housing member 70a to mate with opposing surfaces of the rear housing member 70b so that the speaker compartment is substantially airtight and isolated within the device. Bosses 112 are formed within the front housing member 70a and receive screws for mounting the speaker in alignment with aperture 114. A thin compressible gasket (not shown), such as a paperboard gasket, is preferably provided around the rim of the speaker to mate with sealing rim 116 surrounding the aperture 114. The positioning of a gasket upon rim 116 substantially prevents the front rim of the speaker from producing undesirable vibration or "buzzing" against the front housing member and the gasket further promotes an airtight seal therebetween.

Circuit board support members 118 are formed near the bottom of the speaker compartment in the front housing member 70a for supporting the forward end of circuit board 103. In the microphone compartment of the upper portion of the front housing, a plurality of slots are provided around the periphery of the housing, of which grille slot 120 is representative, for receiving respective engaging tabs (not shown) of grille 94. Similar slots are provided around the periphery of the lower portion of the housing for receiving locking tabs (not shown) of grille 101. Bosses 122 are also provided around the periphery of front housing member 70a, which mate with similar bosses on the rear housing member, for receiving screws to facilitate the front housing member 70a being fastened to the rear housing member 70b.

Figure 9:
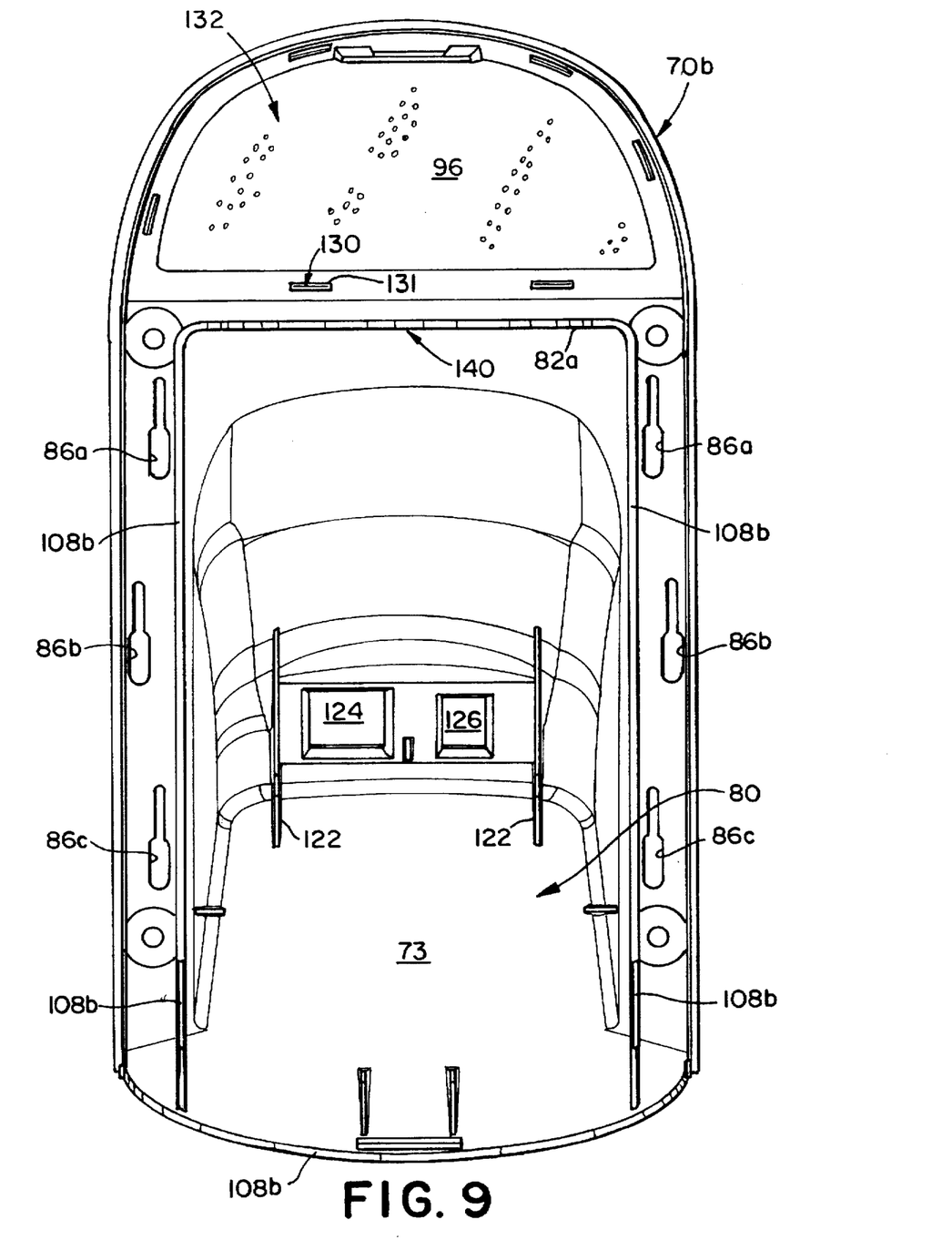
FIG. 9 is a view of the interior of the rear portion of housing member taken along line 9—9 of FIG. 4 with the porous member for supporting the microphone, the speaker and the circuit board removed.

Referring now to FIG. 9, sealing surfaces 108b are formed within the rear housing member 70b for substantially airtight engagement with surfaces 108a of the front housing member 70a. Circuit board supports 122 are formed in the lower portion of the rear of housing member 70b for supporting the rear end of circuit board 103, as also indicated by dotted lines in FIG. 4. Apertures 124 and 126 are formed within the rear of housing member 70b and are located above the circuit board supports 122, so that the DC power jack and the RJ45 telephone jack can be mounted therein and connected to the rear of circuit board 103. The jacks are adapted to be held in substantially airtight engagement within respective apertures 124 and 126. The interior of the speaker compartment 80 is substantially free of parallel planar surfaces, which is facilitated by the complex, bulbous curvature of the rear and side faces of the lower portion of the rear housing member 70b, and also by the angled positioning of the baffles 82a and 82b relative to the flat base of the housing 70. As a result, the formation of standing waves, which could cause undesirable resonance peaks within the speaker compartment 80 is substantially avoided.

Mounting slots 86a–c are formed within the periphery of housing member 70b. The mounting slots are located outside of the sealing boundary defined by surfaces 108b so that the mounting slots are partitioned to be outside of the speaker compartment, so that the substantially airtight integrity of the speaker compartment 80 is maintained. The mounting slots 86a–c are adapted to receive the tabs 94a–c of the mounting bracket 88. Slots for receiving a rear grille, of which slot 130 is representative, are formed about the upper periphery of the rear housing member for receiving grille mounting tabs, of which tab 131 is representative, for mounting rear microphone grille 96 to the microphone compartment area which is completed by the rear housing member.

Figure 10:
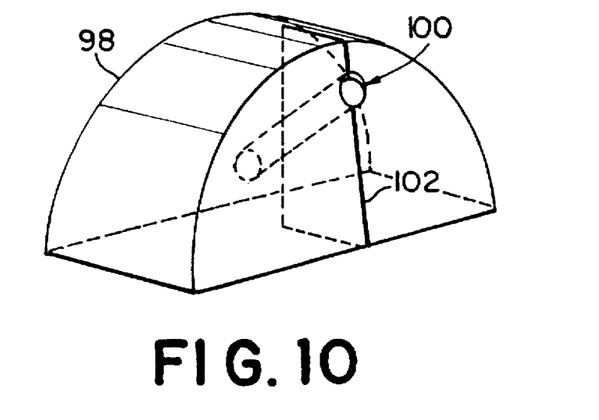
FIG. 10 is a perspective view of a porous member for supporting the microphone in the speakerphone device of FIG. 4.
Figure 11:
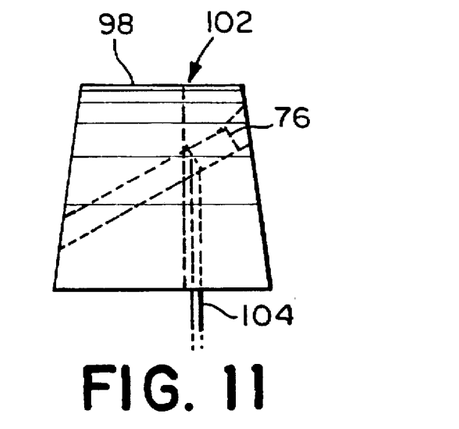
FIG. 11 is a side elevational view of the porous member of FIG. 10 and showing microphone and cable in place.

In order to enhance the mechanical support of the microphone, foam member 98 is provided within the microphone compartment 78. The foam member 98, shown in FIGS. 10 and 11, is formed to be slightly larger than the interior of the assembled microphone compartment. Thus, when the speakerphone device 66 is assembled, the foam member 98 is under compression within the microphone compartment between the front grille 94 and the rear grille 96, which define the front and back of the compartment. The front and rear grilles are perforated such that the perforations occupy between about 25% to 35%, and preferably about 30%, of the surface area of each grille. Larger perforation ratios tend to reduce the ability of the grilles to provide sufficient compression of the foam member 98 within the microphone compartment.

The foam member 98, as shown most clearly in FIG. 10, is dimensioned such that it must be compressed to conform to the size of the microphone compartment. A borehole 100 is formed within the foam member for receiving and orienting the microphone therein, as indicated in FIG. 11. The borehole 100 is aligned at an angle in line with the preferred angular orientation of the microphone within the speakerphone device 66.

In order to facilitate insertion of the microphone and its associated cable into the foam member 98, a slot 102 is formed in the foam member 98 in a plane that intersects borehole 100. In this manner, the foam member 98 can be opened and closed, as a hinge, for placement of the microphone 76 and associated cable 104 therein.

In FIG. 11, there is shown a side view of the foam member 98 with the microphone 76 embedded therein. Additional support for orienting the microphone within the foam member 98 can be provided by employing a semi-rigid microphone cable 104. Prior to inserting the microphone 76 into the foam member, the microphone 76 and the cable 104 are preferably held within a soldering jig for attaching positive and negative conductors within the cable 104 to the microphone at the preferred angle. Then, the microphone and the cable are placed into the foam member 98 with the cable attachment angle being maintained.

Figure 12:
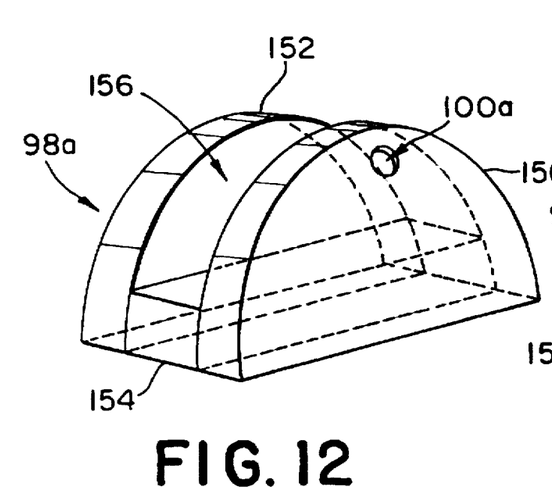
FIG. 12 is a perspective view of an alternative embodiment of the porous member for supporting the microphone of the speakerphone device of FIG. 4.

An alternative design for the foam member 98a is shown in FIG. 12 and designated 98a. The foam member 98a has a void 156 formed therein for providing further acoustic transparency within the microphone compartment. The foam member 98a may be a unitary member, or constructed of a front section 150, a rear section 152, and a center section 154 as shown. The front section 150 and the rear section 152 are shaped to conform to the semi-elliptical cross section of the microphone compartment. The front section 150 and the rear section 152 are held within the microphone compartment between the respective front and rear grilles and the upper and lower surfaces of the microphone compartment formed by the housing 70. An angled borehole 100a is provided near the apex of the front section 150 for supporting the microphone at the preferred angle behind the front grille in the microphone compartment.

Figure 13:
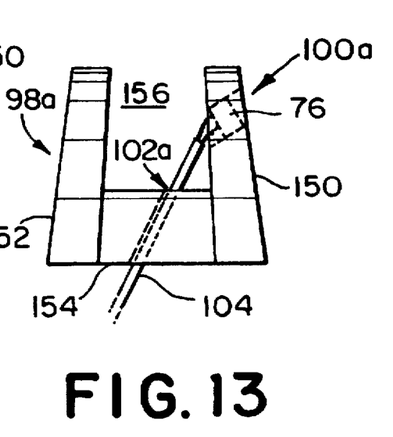
FIG. 13 is a side elevational view of the porous member of the FIG. 12 and showing the microphone and cable in place.

The central section 154 of foam member 98a is shaped to conform with the lower portion of the microphone compartment and facilitates a void 156 between the front section 150 and the rear section 152 in the upper portion of the microphone compartment. The central section 154 is slightly wider than the microphone compartment so that the central section 154 is compressed as previously mentioned. As shown in FIG. 13, a slit 102a is formed within the central section 154 to permit the microphone cable 104 to be positioned therein provide additional support of the microphone 76 at the preferred angle within borehole 100a.

In order to minimize transmission of acoustic signals between the speaker and the microphone along the semi-rigid microphone cable 104, the microphone cable is provided with bends or kinks for attenuating structurally-propagated acoustic signals therein. Referring again to FIG. 8, the microphone cable 104 extends downward from the microphone 76 and through a groove 106 within sealing surface 108a. A similar groove 140 is formed within the baffle 82a (shown in FIG. 9) and aligned with groove 106 thus forming a hole through which the cable passes into a passage 142 between baffles 82a and 82b. The groove 106, may be dimensioned to grip the cable 104 such that the position of the microphone within the microphone compartment is further supported. Alternatively, a compressible gasket or cable sheath may be employed to further securely grip the cable 104 for providing additional support to the microphone.

Within passage 142, the cable 104 is bent to form an elbow 144 and extends toward the side of the passage 142. At the side of the passage 142, the cable 104 includes a further bend 148 for allowing the cable to extend to groove 110 in baffle 82b and into the speaker compartment 80. Within speaker compartment 80, the cable 104 is held within notches formed within stiffening ribs 146a–c, and is further routed toward the bottom of the speaker compartment 80 for connection with the circuit board 103.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

What is claimed is:

1. An apparatus for electronic audio communication, comprising:

a housing;

a speaker mounted in the housing, the speaker having a front rim defining a speaker axis;

a directional microphone having a sensitivity characteristic defining a first angular region and a second angular region, the microphone having reduced sensitivity to audio signals directed within said second region relative to the sensitivity thereof to signals within the first region;

microphone positioning means supported by the housing for positioning the microphone at an elevated position relative to the speaker and a forward position relative to the speaker axis such that the speaker is located substantially within the second region of the sensitivity characteristic of the microphone; and telecommunication circuitry positioned in the housing for establishing two-way audio telecommunication between a user local to the apparatus and a remote location;

wherein said housing includes a base for supporting the apparatus in a first defined orientation upon a generally flat surface, and wherein said speaker is mounted at an oblique angle within the housing relative to the base to direct audio signals from the speaker away from the generally flat surface when the apparatus is positioned thereon.

2. The apparatus of claim 1 wherein said housing comprises mounting means for mounting the apparatus in an elevated orientation relative to the first defined orientation and rotated relative to the first orientation such that the microphone substantially remains oriented toward said first region.

3. A speaker phone apparatus, comprising:

a housing, including a base for supporting the apparatus in a first defined orientation upon a generally flat surface;

a speaker mounted at an oblique angle within the housing relative to the base to direct audio signals from the speaker away from the generally flat surface when the apparatus is positioned thereon, the speaker having a front rim defining a speaker axis;

a directional microphone mounted within the housing, and having a sensitivity characteristic defining a first angular region and a second angular region, the microphone having reduced sensitivity to audio signals directed within said second region relative to the sensitivity thereof to signals within the first region;

microphone positioning means supported by the housing for positioning the microphone at a forward position relative to the speaker axis such that the speaker is located substantially within the second region of the sensitivity characteristic of the microphone; and said housing comprising:

mounting means for mounting the apparatus in an elevated orientation relative to the first defined orientation and rotated relative to the first orientation such that the microphone substantially remains oriented toward said first region; and a partition dividing the interior volume of the housing into a microphone compartment and a speaker compartment.

4. A speakerphone apparatus, comprising:

a housing, including a base for supporting the apparatus in a first defined orientation upon a generally flat surface;

a speaker mounted at an angle within the housing relative to the base to direct audio signals from the speaker away from the generally flat surface when the apparatus is positioned thereon, the speaker having a front rim defining a speaker axis;

a directional microphone mounted within the housing, and having a sensitivity characteristic defining a first angular region and a second angular region, the microphone having reduced sensitivity to audio signals directed within said second region relative to the sensitivity thereof to signals within the first region;

microphone positioning means supported by the housing for positioning the microphone at a forward position relative to the speaker axis such that the speaker is located substantially within the second region of the sensitivity characteristic of the microphone; and said housing comprising:

mounting means for mounting the apparatus in an elevated orientation relative to the first defined orientation and rotated relative to the first orientation such that the microphone substantially remains oriented toward said first region; and a partition dividing the interior volume of the housing into a microphone compartment and a speaker compartment, comprising a pair of baffles enclosing a volume therebetween for damping acoustic transmissions between the microphone compartment and the speaker compartment.

5. The apparatus of claim 3 comprising audio processing circuitry mounted within the speaker compartment.

6. The apparatus of claim 5 wherein the microphone positioning means comprises a substantially rigid electrical conduit extending along a path from within the microphone compartment into the speaker compartment for connection with the audio processing circuitry, the electrical conduit being bent along the path to reduce transmission of acoustic vibrations along the conduit.

7. A speakerphone apparatus, comprising:

a housing, including a base for supporting the apparatus in a first defined orientation upon a generally flat surface, and a partition dividing the interior volume of the housing into a microphone compartment and a speaker compartment;

audio processing circuitry mounted within the speaker compartment;

a speaker mounted at an angle within the housing relative to the base to direct audio signals from the speaker away from the generally flat surface when the apparatus is positioned thereon, the speaker having a front rim defining a speaker axis;

a directional microphone mounted within the housing, and having a sensitivity characteristic defining a first angular region and a second angular region, the microphone having reduced sensitivity to audio signals directed within said second region relative to the sensitivity thereof to signals within the first region;

microphone positioning means supported by the housing for positioning the microphone at a forward position relative to the speaker axis such that the speaker is located substantially within the second region of the sensitivity characteristic of the microphone, the microphone positioning means comprising a porous member positioned in the microphone compartment for supporting the microphone and for maintaining a substantially acoustically transparent environment in the vicinity of the microphone, and a substantially rigid electrical conduit extending along a path from within the microphone compartment into the speaker compartment for connection with the audio processing circuitry, the electrical conduit being bent along the path to reduce transmission of acoustic vibrations along the conduit; and said housing comprising mounting means for mounting the apparatus in an elevated orientation relative to the first defined orientation and rotated relative to the first orientation such that the microphone substantially remains oriented toward said first region.

8. The apparatus of claim 3 wherein the housing is formed to have an acoustically transparent forward aperture and an enclosed rear surface on the speaker compartment, and acoustically transparent forward and rear surfaces on the microphone compartment.

9. The apparatus of claim 8 wherein the front rim of the speaker is sealed against the forward aperture of the speaker compartment such that the speaker compartment is rendered substantially airtight.

10. A speakerphone apparatus, comprising:

a housing, including a base for supporting the apparatus in a first defined orientation upon a generally flat surface;

a speaker mounted at an angle within the housing relative to the base to direct audio signals from the speaker away from the generally flat surface when the apparatus is positioned thereon, the speaker having a front rim defining a speaker axis;

a directional microphone mounted within the housing, and having a sensitivity characteristic defining a first angular region and a second angular region, the microphone having reduced sensitivity to audio signals directed within said second region relative to the sensitivity thereof to signals within the first region;

microphone positioning means supported by the housing for positioning the microphone at a forward position relative to the speaker axis such that the speaker is located substantially within the second region of the sensitivity characteristic of the microphone; and said housing comprising:

mounting means for mounting the apparatus in an elevated orientation relative to the first defined orientation and rotated relative to the first orientation such that the microphone substantially remains oriented toward said first region;

a partition dividing the interior volume of the housing into a microphone compartment and a speaker compartment; and wherein the housing is formed to have an acoustically transparent forward aperture and an enclosed rear surface on the speaker compartment, and acoustically transparent forward and rear surfaces on the microphone compartment; and a bracket for engaging the mounting means and for suspending the housing from a visual display terminal.

11. A speakerphone apparatus suitable for use in a free-standing configuration and an elevated configuration, comprising:

a housing having a base for supporting the apparatus on a generally flat surface in the free-standing configuration, the housing having mounting means for supporting the apparatus in the elevated configuration;

a speaker mounted within the housing at an angle relative to the base to direct acoustic transmissions from the speaker at an angle away from the flat surface in the free-standing configuration, the speaker having a front rim defining a speaker axis;

a directional microphone having a sensitivity characteristic defining an axis of maximum sensitivity and a region of relatively reduced sensitivity, the microphone being mounted within the housing at a forward position relative to the speaker axis and oriented to direct the axis of maximum sensitivity toward a user in the free-standing configuration and to maintain the speaker in the region of reduced sensitivity;

the mounting means being configured to hold the housing at a rotated position in the elevated configuration relative to the free-standing configuration in order to maintain the orientation of the axis of maximum sensitivity toward the user's mouth in the elevated configuration; and telecommunication circuitry positioned in the housing for establishing two-way audio telecommunication between a user local to the apparatus and a remote location.

12. A speakerphone apparatus suitable for use in a free-standing configuration and an elevated configuration, comprising:

a housing having a base for supporting the apparatus on a generally flat surface in the free-standing configuration, the housing having mounting means for supporting the apparatus in the elevated configuration;

a speaker mounted within the housing at an angle relative to the base to direct acoustic transmissions from the speaker at an angle away from the flat surface in the free-standing configuration, the speaker having a front rim defining a speaker axis;

a directional microphone having a sensitivity characteristic defining an axis of maximum sensitivity and a region of relatively reduced sensitivity, the microphone being mounted within the housing at a forward position relative to the speaker axis and oriented to direct the axis of maximum sensitivity toward a user in the free-standing configuration and to maintain the speaker in the region of reduced sensitivity;

the mounting means being configured to hold the housing at a rotated position in the elevated configuration relative to the free-standing configuration in order to maintain the orientation of the axis of maximum sensitivity toward the user's mouth in the elevated configuration; and wherein the speaker axis forms an angle with the base of between about 50° and 70°.

13. The apparatus of claim 12 wherein the microphone is oriented such that the axis of maximum sensitivity forms an angle of between about 20° and 40° relative to the speaker axis.

14. The apparatus of claim 13 wherein the region of reduced sensitivity is defined by an angular region within ±45° about an axis oriented at 180° relative to the axis of maximum sensitivity, and wherein the sensitivity of the microphone in the region is reduced by at least 6 dB relative to the axis of maximum sensitivity.

15. The apparatus of claim 14 wherein the speaker axis forms an angle of about 60° with the base.

16. The apparatus of claim 15 wherein the axis of maximum sensitivity forms an angle of about 30° with the speaker axis.

17. A speakerphone apparatus suitable for use in a free-standing configuration and an elevated configuration, comprising:

a housing having a base for supporting the apparatus on a generally flat surface in the free-standing configuration, the housing having mounting means for supporting the apparatus in the elevated configuration;

a speaker mounted within the housing at an angle relative to the base to direct acoustic transmissions from the speaker at an angle away from the flat surface in the free-standing configuration, the speaker having a front rim defining a speaker axis;

a directional microphone having a sensitivity characteristic defining an axis of maximum sensitivity and a region of relatively reduced sensitivity, the microphone being mounted within the housing at a forward position relative to the speaker axis and oriented to direct the axis of maximum sensitivity toward a user in the free-standing configuration and to maintain the speaker in the region of reduced sensitivity;

the mounting means being configured to hold the housing at a rotated position in the elevated configuration relative to the free-standing configuration in order to maintain the orientation of the axis of maximum sensitivity toward the user's mouth in the elevated configuration; and a bracket for engaging the mounting means and for suspending the housing from a display terminal in the elevated configuration.

18. The apparatus of claim 17 wherein the speaker axis forms an angle of between about 50° and 70° with the base, and wherein the mounting means comprises a mounting surface substantially aligned with the speaker axis and configured for engaging the bracket.

19. The apparatus of claim 18 wherein the mounting surface is formed along a rear surface of the housing.

20. The apparatus of claim 19 wherein the mounting surface is formed along a side portion of the rear of the housing, the housing comprising a second mounting surface similarly formed along an opposite side portion of the rear of the housing, whereby the apparatus is mountable to either side of the display terminal.

21. A speakerphone apparatus suitable for use in a free-standing configuration and an elevated configuration, comprising:

a housing having a base for supporting the apparatus on a generally flat surface in the free-standing configuration, the housing having mounting means for supporting the apparatus in the elevated configuration;

a speaker mounted within the housing at an angle relative to the base to direct acoustic transmissions from the speaker at an angle away from the flat surface in the free-standing configuration, the speaker having a front rim defining a speaker axis;

a directional microphone having a sensitivity characteristic defining an axis of maximum sensitivity and a region of relatively reduced sensitivity, the microphone being mounted within the housing at a forward position relative to the speaker axis and oriented to direct the axis of maximum sensitivity toward a user in the free-standing configuration and to maintain the speaker in the region of reduced sensitivity;

the mounting means being configured to hold the housing at a rotated position in the elevated configuration relative to the free-standing configuration in order to maintain the orientation of the axis of maximum sensitivity toward the user's mouth in the elevated configuration; and partition means located within the housing for dividing the interior of the housing into a microphone compartment housing the microphone, and a speaker compartment housing the speaker.

22. The apparatus of claim 21 wherein the speaker compartment is substantially air tight and wherein the microphone compartment comprises acoustically-transparent front and rear surfaces.

23. The apparatus of claim 22 comprising a porous foam member positioned within the microphone compartment and configured for supporting the microphone at said forward position.

24. The apparatus of claim 23 wherein the housing comprises a semi-elliptical arch forming an upper surface of the microphone compartment, said partition means forming a lower surface of the microphone compartment, and wherein the microphone is supported within the foam member to be nearer to the upper surface than to the lower surface.

25. The apparatus of claim 23 wherein said foam member comprises an open cell foam having between about 15 and about 50 pores per inch.

26. An apparatus for electronic audio communication, comprising:

a housing, including a base for supporting the apparatus in a first defined orientation upon a generally flat surface;

a speaker mounted at an angle within the housing relative to the base to direct audio signals from the speaker away from the generally flat surface when the apparatus is positioned thereon, the speaker having a front rim defining a speaker axis;

a directional microphone having a sensitivity characteristic defining a first angular region and a second angular region, the microphone having reduced sensitivity to audio signals directed within said second region relative to the sensitivity thereof to signals within the first region;

microphone positioning means supported by the housing for positioning the microphone at an elevated position relative to the speaker and a forward position relative to the speaker axis such that the speaker is located substantially within the second region of the sensitivity characteristic of the microphone;

telecommunication circuitry positioned in the housing for establishing two-way audio telecommunication between a user local to the apparatus and a remote location; and mounting means for mounting the apparatus at an elevated position upon a display terminal, the mounting means configured to positioned the apparatus at a second orientation rotated relative to the first orientation such that the microphone remains substantially oriented toward said first region, and wherein said telecommunication circuitry is adapted for connection with computer communication interface circuitry associated with the display terminal.

* * * * *